United States Patent
Yoshikawa

(10) Patent No.: US 9,441,882 B2
(45) Date of Patent: Sep. 13, 2016

(54) GAS FEEDING APPARATUS FOR POWDER AND GRANULAR MATERIAL FEEDER

(71) Applicant: YOSHIKAWA CORPORATION, Satsumasendai-shi, Kagoshima (JP)

(72) Inventor: Osamu Yoshikawa, Satsumasendai (JP)

(73) Assignee: YOSHIKAWA CORPORATION, Satsumasendai-shi, Kagoshima (JP)

( * ) Notice: Subject to any disclaimer, the term of this patent is extended or adjusted under 35 U.S.C. 154(b) by 106 days.

(21) Appl. No.: 14/401,047

(22) PCT Filed: Nov. 6, 2012

(86) PCT No.: PCT/JP2012/078699
§ 371 (c)(1),
(2) Date: Nov. 13, 2014

(87) PCT Pub. No.: WO2013/183179
PCT Pub. Date: Dec. 12, 2013

(65) Prior Publication Data
US 2015/0143710 A1    May 28, 2015

(30) Foreign Application Priority Data
Jun. 8, 2012   (JP) ................. 2012-130489

(51) Int. Cl.
*F26B 17/12*    (2006.01)
*B65G 65/48*    (2006.01)
(Continued)

(52) U.S. Cl.
CPC .......... *F26B 17/12* (2013.01); *B65G 65/4836* (2013.01); *F26B 25/002* (2013.01); *F26B 25/10* (2013.01); *F26B 17/14* (2013.01); *F26B 2200/08* (2013.01)

(58) Field of Classification Search
CPC .......... F26B 1/00; F26B 17/00; F26B 17/12; F26B 19/00; F27B 7/00; F27B 7/02; F27B 15/00; F27B 15/02; B65G 53/00; B65G 53/40

USPC .............. 34/168, 173, 196; 432/14, 58, 106; 406/122

See application file for complete search history.

(56) References Cited

U.S. PATENT DOCUMENTS 4,900,200 A * 2/1990 Harumoto .............. B65G 53/26
                                                    406/106
5,944,513 A * 8/1999 Yokota .................. F27B 7/2025
                                                    432/106
(Continued)

FOREIGN PATENT DOCUMENTS

DE   WO 2005030380 A2 *  4/2005 ............... B01J 2/16
JP          53-128876 A     11/1978
(Continued)

*Primary Examiner* — Stephen M Gravini
(74) *Attorney, Agent, or Firm* — Novick, Kim & Lee, PLLC; Jae Youn Kim

(57) ABSTRACT

In a gas feeding apparatus for a powder and granular material feeder, in which a powder and granular material 3 supplied to an upper portion tubular hopper 11 is continuously supplied and discharged downward by a powder and granular material feeder provided below the tubular hopper 11, a first feed port 20 for a gas is provided in an upper surface 1*a* of a bottom plate 1' on a lower surface of a boss portion for a set of rotary blades 8 of the powder and granular material feeder so that the gas can be fed to a space S between the upper surface 1*a* of the bottom plate 1' of the powder and granular material feeder and the lower surface of the boss portion. Further, an annular damming plate 22 is formed on the lower surface of the boss portion on the outer side of the first feed port 20 so that the gas fed into the space S through the first feed port 20 can be fed in a radial direction into the powder and granular material feeder via slits 23, 24 provided around the annular damming plate 22.

13 Claims, 5 Drawing Sheets

(51) Int. Cl.
 *F26B 25/00* (2006.01)
 *F26B 25/10* (2006.01)
 *F26B 17/14* (2006.01)

(56) References Cited

U.S. PATENT DOCUMENTS

| | | | | |
|---|---|---|---|---|
| 6,079,118 | A * | 6/2000 | Kiyokawa | F26B 17/20 |
| | | | | 34/134 |
| 6,092,301 | A * | 7/2000 | Komanowsky | F26B 5/048 |
| | | | | 34/263 |
| 6,253,465 | B1 * | 7/2001 | Ichitani | B01J 8/36 |
| | | | | 209/139.1 |
| 7,797,854 | B2 * | 9/2010 | Huettlin | B01J 2/16 |
| | | | | 34/73 |
| 7,908,765 | B2 * | 3/2011 | Waldron | F26B 3/08 |
| | | | | 264/117 |
| 8,365,433 | B2 * | 2/2013 | Ogura | C05F 9/02 |
| | | | | 110/229 |
| 2014/0137862 | A1 * | 5/2014 | Chen | A61M 15/0065 |
| | | | | 128/203.15 |
| 2015/0143710 | A1 * | 5/2015 | Yoshikawa | B65G 65/4836 |
| | | | | 34/168 |
| 2015/0345863 | A1 * | 12/2015 | O'Gary | F26B 5/00 |
| | | | | 34/509 |

FOREIGN PATENT DOCUMENTS

| | | |
|---|---|---|
| JP | H03-35935 U | 4/1991 |
| JP | H07-047261 A | 2/1995 |
| JP | H07-40643 U | 7/1995 |
| JP | 2001-278453 A | 10/2001 |
| JP | 2003-004377 A | 1/2003 |
| JP | 2003-194465 A | 7/2003 |
| JP | 2004-51258 A | 2/2004 |
| JP | 2013253756 A * | 12/2013 |

* cited by examiner

GAS FEEDING APPARATUS FOR POWDER AND GRANULAR MATERIAL FEEDER

TECHNICAL FIELD

The present invention relates to a gas feeding apparatus provided for a powder and granular material feeder in order to perform processing such as drying, humidification, and fumigation on a powder and granular material supplied to the powder and granular material feeder.

BACKGROUND ART

A conventional powder and granular material feed apparatus has been proposed in which a rotary body is formed by erecting an outer tube on a bottom plate, supporting an inner tube above the bottom plate via a powder and granular material discharge clearance, providing a through hole in the center of the bottom plate, fitting a boss to an upright rotary shaft that penetrates the through hole, providing a cap on an upper portion of the boss, and providing a set of central rotary blades on the bottom plate via the boss, an annular passage being formed between the inner and outer tubes by bringing a tubular outer edge of the rotary body close to an inner periphery of the outer tube, and powder and granular material discharged from the powder and granular material discharge clearance is discharged through a powder and granular material discharge port formed in the annular passage (Patent Document 1).

In the powder and granular material feed apparatus having this configuration, the supplied powder and granular material is dried by feeding dry air into the interior from an outer peripheral portion of the outer tube.

Further, a powder and granular material drying apparatus has been proposed in which is configured such that a drying subject material and hot air are supplied into a tubular drying case main body from an outer peripheral side face of the case main body, an upward swirling flow is generated in the case main body by rotating blades provided in a bottom portion of the case main body such that the drying subject material and the hot air are separated in a drying material separation case provided in an upper portion of the case main body, whereupon the drying subject material is discharged from the separation case (Patent Document 2).

Patent Document 1: Japanese Patent Application Publication No. 2001-278453

Patent Document 2: Japanese Patent Application Publication No. 2003-4377

DISCLOSURE OF THE INVENTION

However, in the former drying apparatus described above, dry air is supplied to the interior of the feed apparatus from the outer peripheral portion of the outer tube in order to dry the supplied powder and granular material, and therefore the dry air cannot be sufficiently supplied to raw material in the central lower portion of a hopper. It is therefore difficult to dry the powder and granular material evenly.

In the latter drying apparatus described above, the drying subject material and the hot air are supplied into the case main body together and made to rise upward through the case main body. Accordingly, this drying apparatus can be used as a drying apparatus for lightweight powder and granular materials such as fine powder, but is not suitable for comparatively heavy raw material such as pellets.

The present invention has been designed in consideration of these problems in the related art, and an object thereof is to provide a gas feeding apparatus for a powder and granular material feeder, with which a powder and granular material to be supplied can be evenly dried and so on in the powder and granular material feeder.

Another object of the present invention is to provide a gas feeding apparatus for a powder and granular material feeder, with which various powder and granular materials such as pellets can be evenly dried and so on.

To achieve the objects described above, the present invention is first, constituted by a gas feeding apparatus for a powder and granular material feeder, in which a particulate feed case is formed by erecting an outer tube on a bottom plate, an inner tube having upper and lower openings is provided above the bottom plate via a particulate discharge clearance, and an annular passage is formed between the inner and outer tubes by concentrically connecting an outside surface of the inner tube to an upper end of the outer tube using a donut-shaped lid body, wherein an upright rotary shaft is provided in a center of the bottom plate, a boss portion is provided on an upper portion of the upright rotary shaft, a plurality of rotary blades extending over the bottom plate are provided on an outer periphery of the boss portion at a fixed distance from the bottom plate, and respective tip ends of the rotary blades are connected to a rotating wheel provided to extend around an inner peripheral surface of the outer tube, and wherein a discharge port is formed in the bottom plate as an opening in the annular passage such that a powder and granular material spread over the annular passage at a predetermined angle of repose from the powder and granular material discharge clearance is fed to the discharge port by the rotary blades. In the gas feeding apparatus for a powder and granular material feeder, a first feed port for a gas is provided in the bottom plate on a lower surface of the boss portion so that the gas can be fed into a space between an upper surface of the bottom plate and the lower surface of the boss portion, and an annular damming plate is formed concentrically with the inner and outer tubes on the lower surface of the boss portion on an outer side of the first feed port so that the gas fed into the space through the first feed port can be fed in a radial direction via slits provided around the annular damming plate.

According to this configuration, for example, the gas can be fed in the radial direction from the vicinity of a central portion of the upright rotary shaft of the rotary blades, and therefore the gas can be fed sufficiently even to the powder and granular material in a central lower portion of the powder and granular material feeder, where conventionally the gas cannot easily be fed in a sufficient amount. As a result, for example, the powder and granular material can be evenly dried and so on.

The slits provided in the annular damming plate may be positioned on a lower surface side of the rotary blades provided on the outer periphery of the boss portion.

According to this configuration, the gas can be fed in an outside direction from the lower surface side of the rotary blades near a base portion thereof, and therefore the gas can also be sufficiently fed to the lower surface side of the rotary blades, where the density of the powder and granular material is comparatively low. Hence, the gas can be fed to all of the powder and granular material on the bottom plate, and as a result, for example, the powder and granular material can be evenly dried and so on.

The slits provided in the annular damming plate may be constituted by an upper portion slit provided between the lower surface of the boss portion and the annular damming plate, and a lower portion slit provided between a lower end of the annular damming plate and the upper surface of the bottom plate.

According to this configuration, the gas can be fed in the outside direction from the lower surface side of the rotary blades near the base portion thereof, and therefore the gas can also be sufficiently fed to the lower surface side of the rotary blades, where the density of the powder and granular material is comparatively low. Hence, the gas can be fed to all of the powder and granular material on the bottom plate, and as a result, for example, the powder and granular material can be evenly dried and so on.

The first feed port may be provided in each of symmetrical positions along a diameter line of the annular damming plate on the lower surface of the boss portion, centering on the upright rotary shaft.

According to this configuration, the gas can be fed more evenly over the entire surface of the bottom plate of the powder and granular material feeder.

A second feed port may be provided in the donut-shaped lid body such that the gas is fed into the annular passage through the second feed port in the donut-shaped lid body.

According to this configuration, in addition to feeding the gas from the central portion of the powder and granular material feeder in the vicinity of the upright rotary shaft, the gas can also be fed from the annular passage serving as an outer periphery of the powder and granular material feeder, and as a result, the powder and granular material can be dried and so on more efficiently.

A powder and granular material introduction hopper may be fixedly connected to an upper end of the inner tube, and an exhaust fan for the gas fed into the powder and granular material feeder may be provided in the hopper.

A tubular hopper (11) may be used as the hopper. By providing the exhaust fan in the hopper, the gas fed into the powder and granular material feeder can be discharged forcibly, and as a result, the powder and granular material can be dried and so on even more efficiently.

In the gas feeding apparatus for a powder and granular material feeder according to any of the first to sixth items described above, a rotary valve is provided in the discharge port for the powder and granular material.

According to this configuration, outflow of the gas through the powder and granular material discharge port can be suppressed by the rotary valve such that only the powder and granular material is discharged, and as a result, the powder and granular material can be dried and so on even more efficiently.

According to the present invention, configured as described above, the gas can be fed in the radial direction from the vicinity of the central portion of the upright rotary shaft of the rotary blades, and can therefore be fed sufficiently even to the powder and granular material in the central lower portion of the powder and granular material feeder, where conventionally the gas cannot easily be supplied in a sufficient amount. As a result, the powder and granular material can be evenly dried and so on such that a high quality product can be obtained.

Further, the gas can be fed in the outside direction from the lower surface side of the rotary blades near the base portion thereof, and therefore the gas can also be sufficiently fed to the lower surface side of the rotary blades, where the density of the powder and granular material is comparatively low. Hence, the gas can be fed to all of the powder and granular material on the bottom plate, and as a result, the powder and granular material can be evenly dried and so on.

Furthermore, as well as feeding the gas from the central portion of the powder and granular material feeder in the vicinity of the upright rotary shaft, the gas can be fed from the annular passage serving as the outer periphery of the powder and granular material feeder, and as a result, the powder and granular material can be dehumidified, dried, and so on more efficiently.

Moreover, by providing the exhaust fan in the hopper, the gas fed into the powder and granular material feeder can be discharged forcibly, and as a result, the powder and granular material can be dried and so on even more efficiently.

Furthermore, by providing the rotary valve in the discharge port, outflow of the gas through the powder and granular material discharge port can be suppressed such that only the powder and granular material is discharged. As a result, the powder and granular material can be dried and so on even more efficiently.

BEST MODE FOR CARRYING OUT THE INVENTION

A gas feeding apparatus for a powder and granular material feeder according to the present invention will be described in detail below.

Figure 1:
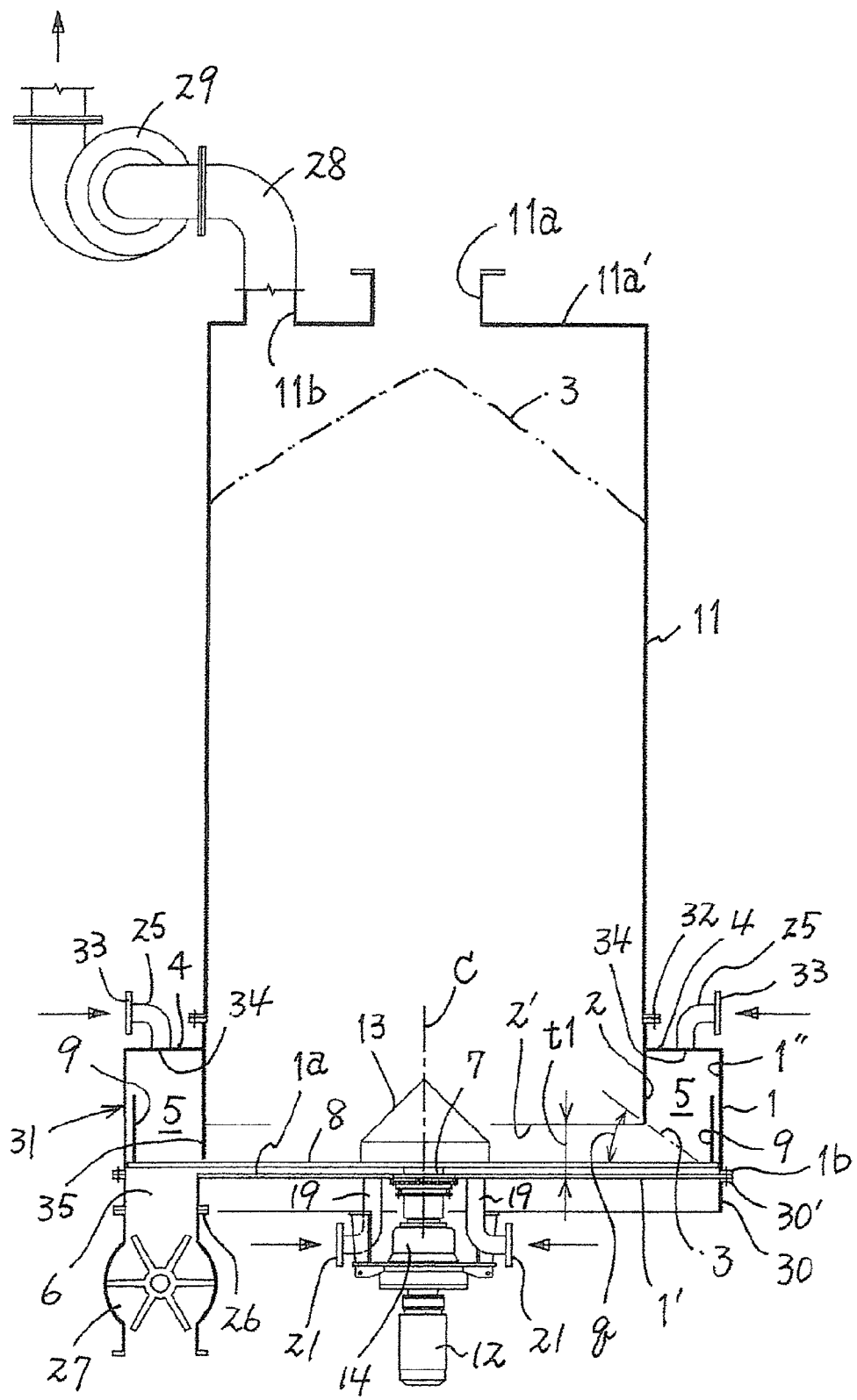
FIG. 1 is a lateral sectional view of a gas feeding apparatus for a powder and granular material feeder according to the present invention.

FIG. 1 is a lateral sectional view of a vertical type powder and granular material feeder to which the gas feeding apparatus is applied.

As shown in FIG. 1, a powder and granular material feed case 31 is formed by a bottom plate 1' and an outer tube 1 by fixing the bottom plate 1' onto a machine casing 30 using a flange 30' thereof, erecting the outer tube 1 on the bottom plate 1', and fixing a lower end flange 1b of the outer tube 1 to the flange 30' of the machine casing 30.

An inner tube 2 is disposed on the bottom plate 1' inside the outer tube 1 so as to be concentric with the outer tube 1, and by supporting a donut-shaped lid body 4 provided on an outer periphery of the inner tube 2 on an upper end of the outer tube 1 in a condition where a discharge clearance t1 for a powder and granular material 3 is opened between a lower end 2' of the inner tube 2 and an upper surface 1a of the bottom plate 1', a donut-shaped upper end opening portion 1" of the outer tube 1 is closed such that the powder and granular material discharge clearance t1 is maintained, an annular passage 5 for the powder and granular material is formed between the inner and outer tubes 1, 2, and a discharge port 6 for the powder and granular material is formed in the bottom plate 1' as an opening in the passage 5.

Figure 2:
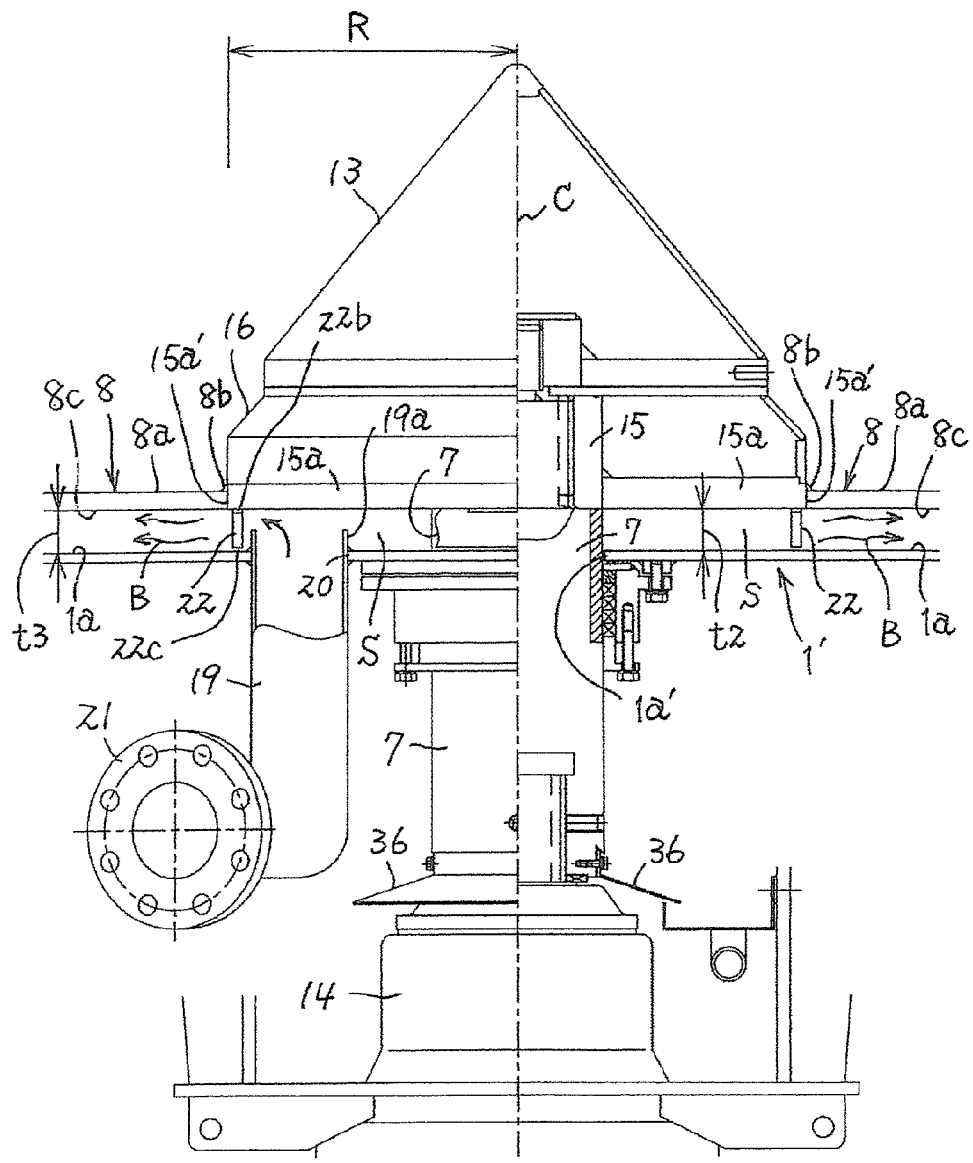
FIG. 2 is an enlarged lateral sectional view showing the vicinity of an upright rotary shaft of the feeding apparatus.

Further, a central opening 1a' (see FIG. 2) is opened in the center of the bottom plate 1', and an upright rotary shaft 7 having a rotary central axis C is provided to project through the central opening 1a'. As shown in FIG. 2, a boss 15 that shares the rotary central axis C is connected to an upper end portion of the upright rotary shaft 7, and a conical cap 13 that also shares the rotary central axis C is connected fixedly to the boss 15.

An inner periphery of an annular boss disc 15a having a radius R is fixed to a lower end portion outer periphery of the boss 15 so as to have the rotary central axis C as a shared center. The boss disc 15a is provided at a clearance t2 of several tens of millimeters (40 mm, for example) relative to the upper surface 1a of the bottom plate 1' such that an annular space S corresponding to the clearance t2 and having the radius R is formed between a lower surface of the boss disc 15a and the upper surface 1a of the bottom plate 1'. Note that a clearance between an outer periphery of the boss disc 15a and a lower end outer periphery of the cap 13 is closed by an annular cone 16. The boss 15 and the boss disc 15a will be referred to as a boss portion. Hence, the boss portion can be constituted by the boss 15 and the boss disc 15a provided on the lower end portion outer periphery of the boss 15. The annular space S is formed between the upper surface 1a of the bottom plate 1' and the lower surface of the boss portion.

A base portion 8b of a set of rotary blades 8 disposed at a clearance t3 (a clearance of 40 mm identical to the clearance t2, for example) from the bottom plate 1a is fixed to an outer peripheral surface 15a' of the boss disc 15a so as to extend over the upper surface 1a of the bottom plate 1'. In other words, the base portion 8b of the rotary blades 8 is provided on the outer periphery of the boss disc 15a.

Figure 4:
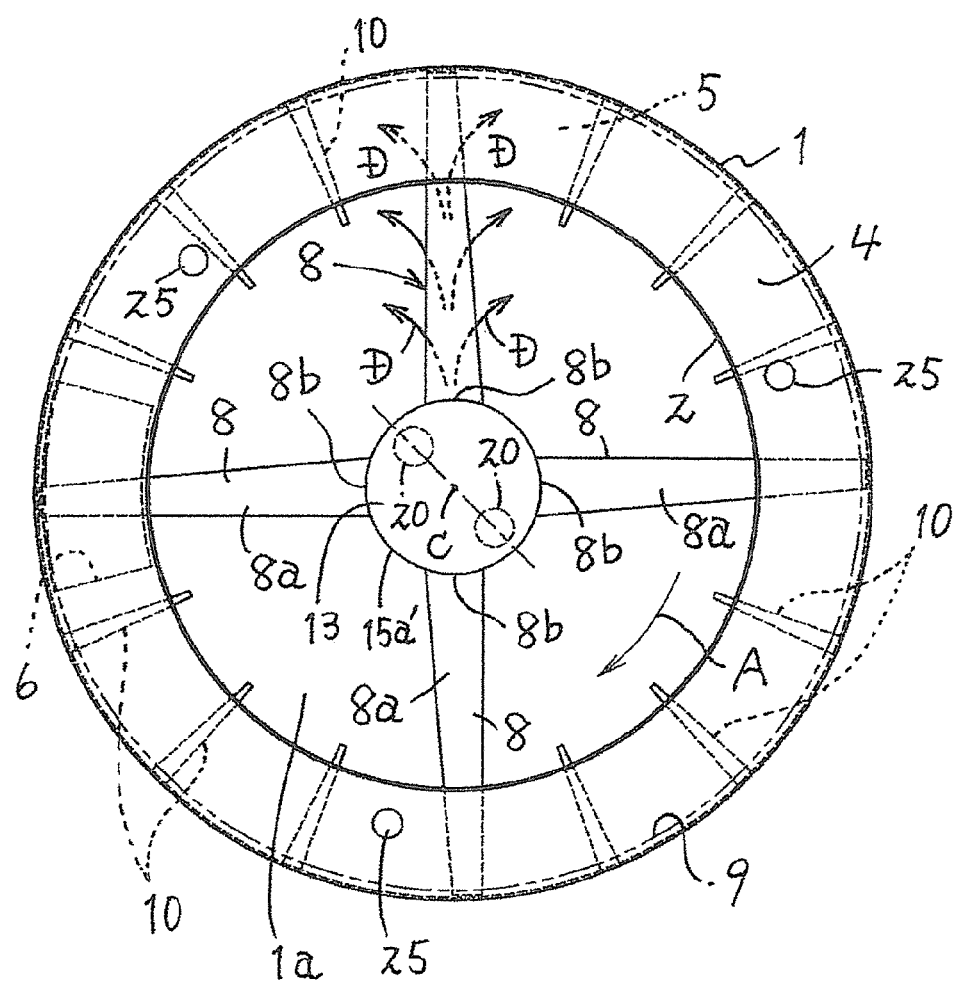
FIG. 4 is a plan view of the powder and granular material feeder, showing a set of rotary blades of the powder and granular material feeder in the feeding apparatus.

As shown in FIG. 4, the rotary blades 8 are constituted by four spokes 8a extending toward the inner periphery of the outer tube 1 from the base portion 8b, and a rotating wheel (a tubular outer edge) 9 is provided on respective tip end portions thereof so as to extend around the inner periphery of the outer tube 1. Twelve inwardly oriented rotary vanes 10 oriented in the direction of the inner tube 2 are provided on the rotating wheel 9 at an identical height to the spokes 8a.

A first feed port (opening) 20 is provided in the bottom plate 1' within a range of the annular space S on the lower surface side of the boss disc 15a of the boss 15 in a position in the vicinity of an outer periphery of the space S, a tip end 19a of a feed pipe 19 is connected fixedly to the first feed port 20 from the lower surface side of the bottom plate 1', and a connecting flange 21 is provided on another end portion of the feed pipe 19. The tip end 19a of the feed pipe 19 projects slightly upward from the upper surface 1a of the bottom plate 1'. The height of a projection of the tip end 19a from the upper surface 1a of the bottom plate 1' is set to be half the height of the vertical clearance t2 of the annular space S, for example.

An air feeder (not shown), for example, is connected to the connecting flange 21 such that a gas (dry air, for example) is fed into the feed pipe 19 from the air feeder. The dry air can then be fed into the annular space S on the lower surface of the boss disc 15a through the feed pipe 19.

Figure 3A:
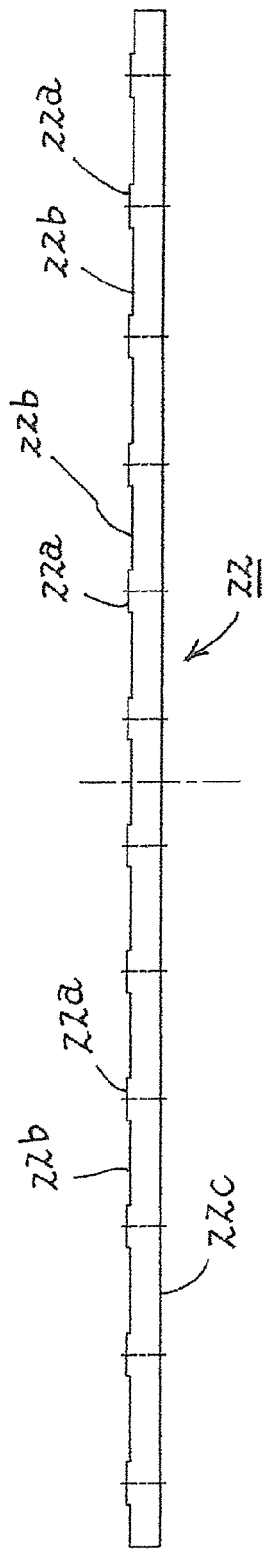
FIG. 3A is a view showing a condition in which an annular damming plate used in the feeding apparatus is elongated into a planar form.
Figure 3B:
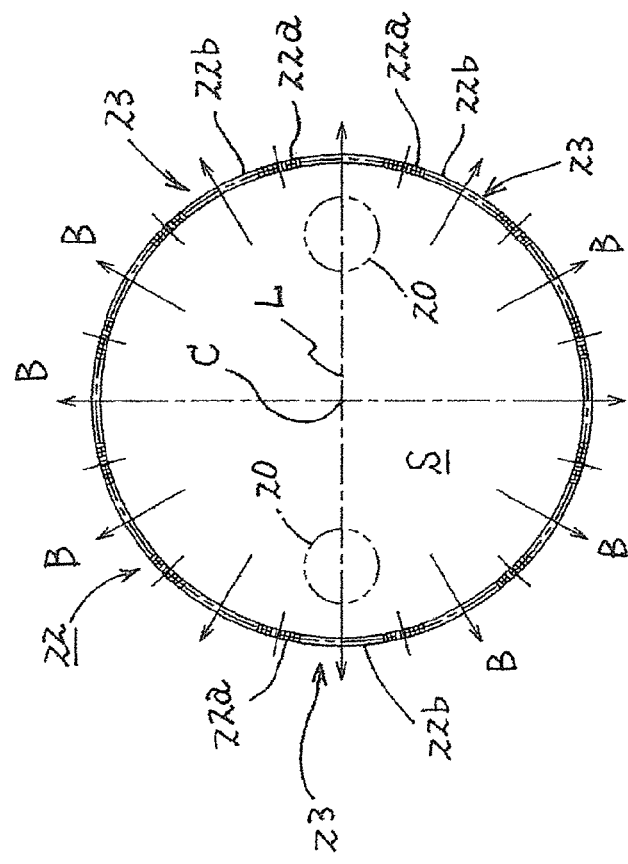
FIG. 3B is a plan view of the annular damming plate used in the feeding apparatus.

As shown in FIG. 3B, another first feed port (opening) 20 is provided in the annular space S (annular damming plate 22) in a symmetrical position of the bottom plate 1' along a diameter line L (a point symmetrical position centering on the rotary central axis C). The feed pipe 19 is connected to the other first feed port 20 similarly from the lower side of the bottom plate 1' so that the gas (dry air, for example) can be supplied to the two feed pipes 19 (see FIG. 1). The projection height of the tip end 19a of the other feed pipe 19 from the upper surface 1a of the bottom plate 1' is likewise set at a position of half the height of the vertical clearance t2 of the annular space S.

An annular damming plate 22 having a radius R substantially identical to the radius R of the annular space S and having the rotary central axis C as a shared center is suspended from and fixed to the lower surface of the boss disc 15a in the vicinity of the outer peripheral edge by an upper end surface 22a thereof.

To facilitate description of the annular damming plate 22, FIG. 3A shows the annular damming plate 22 elongated into a linear shape. As shown in the drawing, recessed portions 22b are provided in an upper edge of the annular damming plate 22 at fixed intervals around the entire circumference such that when the annular damming plate 22 is fixed to the lower surface of the boss disc 15a by the upper end surface 22a, upper portion slits 23 (vertical direction clearances t4, where t4=4 mm, for example) constituted by the recessed portions 22b extending along the lower surface of the boss disc 15a are formed around the annular damming plate 22 at fixed angular intervals (see FIG. 5). Note that in this embodiment, the upper portion slits 23 are provided in the annular damming plate 22 in twelve locations.

Figure 5A:
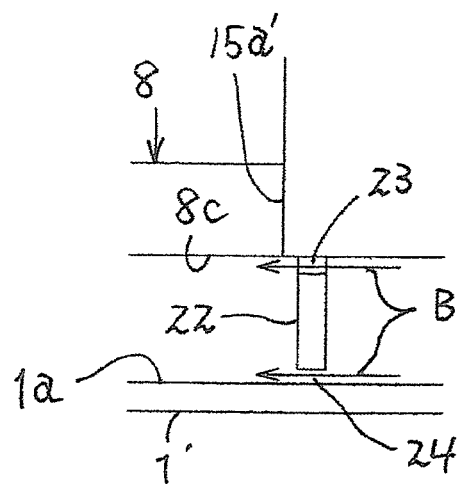
FIG. 5A is an enlarged sectional view showing the vicinity of the annular damming plate of the feeding apparatus.
Figure 5B:
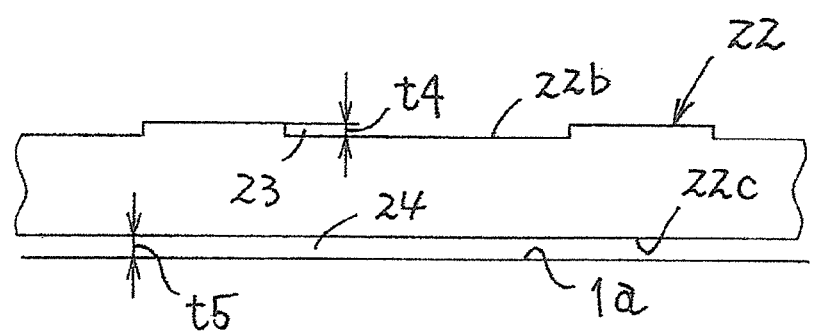
FIG. 5B is an enlarged side view showing the vicinity of the annular damming plate.

Furthermore, when the annular damming plate 22 is fixed to the lower surface of the boss disc 15a, a lower portion slit 24 having a vertical direction clearance t5 (where t5=4 mm, for example) is formed between a lower end peripheral edge 22c of the annular damming plate 22 and the upper surface 1a of the bottom plate 1' (see FIG. 5).

Hence, as shown in FIG. 3B, the gas (dry air) fed into the annular space S from the feed pipe 19 is fed in a radial direction (the direction of arrow B) around the annular damming plate 22 through the upper portion slits 23 in the annular damming plate 22, and then fed in the radial direction (the direction of arrow B) from the entire periphery of the annular damming plate 22 through the lower portion slit 24, and as a result, the gas is fed over the entire upper surface 1a of the bottom plate 1', or in other words the entirety of the upper surface 1a of the bottom plate 1' in the inner tube 2 and the upper surface 1a of the bottom plate 1' in the annular passage 5. Thus, the upper portion slits 23 and the lower portion slit 24 in the annular damming plate 22 constitute slits.

Further, as shown in FIG. 1, a second feed port (opening) 34 is provided in a plate surface of the donut-shaped lid body 4, a feed pipe 25 is connected to the second feed port 34, and an air feeder (not shown), for example, is connected to a flange 33 of the feed pipe 25, whereby dry air can be fed as a gas into the annular passage 5 from the donut-shaped lid body 4 through the feed pipe 25. The feed pipe 25 is provided in the upper surface of the donut-shaped lid body 4 in three locations, for example, at fixed angular intervals in a circumferential direction (see FIG. 4).

A tubular hopper (a straight hopper) 11 having a diameter identical to the inner tube 2 is connected to an upper portion of the inner tube 2 by a flange 32, and a powder and granular material introduction port 11a is formed as an opening in the center of an upper surface 11a' of the tubular hopper 11.

The powder and granular material 3 is supplied into the tubular hopper 11 through the material introduction port 11a so as to spread from the powder and granular material discharge clearance t1 in the lower end of the inner tube 2 toward the annular passage 5 side at a predetermined angle of repose q relative to the annular passage 5, and by driving the upright rotary shaft 7 in the direction of arrow A in this condition, the spokes 8a and the inwardly oriented rotary vanes 10 of the rotary blades 8 rotate through the powder and granular material 3 in the direction of arrow A so as to scrape the powder and granular material 3 in the inner tube 2 out to the annular passage 5 side, with the result that the powder and granular material 3 in the annular passage 5 is discharged downward through the discharge port 6.

The upright rotary shaft 7 is connected to a drive motor 12 via a reduction gear 14, and the rotary blades 8 are driven to rotate in the direction of arrow A by the drive motor 12.

A rotary valve 27 is connected to the discharge port 6 via a flange 26 to prevent the dry air from flowing out through the discharge port 6 and ensure that only the powder and granular material 3 is discharged downward following drying or the like.

Furthermore, an opening 11b is provided in the upper surface 11a' of the tubular hopper 11 and an exhaust fan 29 is provided in the opening 11b via an exhaust pipe 28 so that the dry air fed into the powder and granular material feeder can be discharged forcibly.

The present invention is configured as described above, and next, an operation of the gas feeding apparatus for a powder and granular material feeder according to the present invention will be described.

The powder and granular material 3, which is constituted by pellets or the like, for example, is introduced into the tubular hopper 11 up to an upper end level thereof through the powder and granular material introduction port 11a (see the dotted line in FIG. 1). The powder and granular material 3 then flows out of the inner tube 2 into the annular passage 5 at the angle of repose q. At this time, the powder and granular material is stored densely in the tubular hopper 11 and the inner tube 2, and the powder and granular material 3 also exists densely on the upper surface of the rotary blades 8. On a lower surface 8c side of the rotary blades 8 (see FIG. 2), however, the density of the powder and granular material 3 is lower than in other regions.

Then, when the drive motor 12 is driven to drive the upright rotary shaft 7 such that the rotary blades 8 and the inwardly oriented rotary vanes 10 rotate in the direction of arrow A, the powder and granular material 3 in the annular passage 5 is gradually fed in the direction of the arrow A on the basis of the rotary motion of the rotary blades 8 and the inwardly oriented rotary vanes 10, whereby the powder and granular material 3 falls downward through the discharge port 6 in a continuous feed.

In this powder and granular material feeding condition, the powder and granular material 3 in the annular passage 5 is lifted onto the upper surface of the rotary blades 8 by the rotation of the rotary blades 8 in the direction of arrow A, and in this condition, the powder and granular material 3 is carried by the rotary blades 8 in the direction of arrow A. Likewise during conveyance, therefore, the density of the powder and granular material 3 is low on the lower surface 8c side of the rotary blades 8 from the base portion 8b part thereof up to the tip end portions.

Furthermore, at the same time as the drive motor 12 is driven, the air feeder is driven such that dry air is fed through the feed pipes 19 provided in two locations from the first feed ports 20 into the annular space S. Moreover, dry air is fed simultaneously through the feed pipes 25 provided in three locations in the donut-shaped lid body 4 from the second feed ports 34 into the annular passage 5.

The dry air fed into the annular space S below the boss 15 is fed upward from the tip end 19a of the feed pipe 19 toward the lower surface of the boss disc 15a, and then fed in a horizontal direction along the lower surface of the boss disc 15a. The dry air is then fed in a radial direction (the direction of arrow B in FIG. 3B) centering on the rotary central axis C through the plurality of upper portion slits 23 provided in the annular damming plate 22, and simultaneously fed in a radial direction (the direction of arrow B) centering on the rotary central axis C from the entire circumference of the lower portion slit 24 in the annular damming plate 22. As a result, the dry air is fed evenly over the entire upper surface 1a of the bottom plate 1' of the powder and granular material feed case 31 from the central portion thereof.

Further, the dry air (gas) flowing out through the first feed ports 20 is temporarily dammed within the annular space S constituted by the annular damming plate 22, and then flows out in the radial direction (the direction of arrow B) through the upper portion slits 23 and the lower portion slit 24, which form narrow outflow ports in the annular space S. Accordingly, the pressure of the gas in the annular space S increases, leading to an increase in flow velocity of the gas flowing out through the slits 23, 24, and as a result, the gas can be fed more efficiently in the radial direction over the entire upper surface 1a of the bottom plate 1' such that the powder and granular material 3 can be evenly dried and so on. Furthermore, the dry air supplied to the upper surface 1a of the bottom plate 1' rises through the tubular hopper 11 so as to be discharged through the exhaust pipe 28, and therefore the powder and granular material in the tubular hopper 11 can be dried.

Moreover, as shown by arrow B in FIG. 2, all of the dry air is fed in the tip end portion direction of the rotary blades 8 along the lower surface 8c side of the rotary blades 8 and fed in a direction passing over the upper surface 1a of the bottom plate 1' (a direction indicated by arrows D in FIG. 4) from respective edge sides of the spokes 8a of the rotary blades 8. Hence, the dry air passes along the lower surface 8c side of the rotary blades 8 so as to be fed to the powder and granular material in the inner tube 2 and the annular passage 5 from left and right side edges of the rotary blades 8, and therefore sufficient dry air (gas) can be supplied to the lower surface 8c side of the rotary blades 8, where the density of the powder and granular material is low, with the result that all of the powder and granular material 3 can be evenly and sufficiently dried.

Furthermore, the dry air can be fed over the entire upper surface 1a of the bottom plate 1' in a substantially radial manner in an outer peripheral direction from the rotary central axis C side on the base portion 8b side of the rotary blades 8, or in other words from the lower portion of the boss disc 15a (the boss portion) serving as the rotary center side of the rotary blades 8, and can therefore be supplied sufficiently even to the powder and granular material 3 in the vicinity of the upright rotary shaft 7 in the central lower portion of the hopper, where conventionally the dry air cannot be supplied in a sufficient amount. As a result, the powder and granular material 3 can be evenly dried and so on.

Further, the dry air (gas) is fed downward into the annular passage 5 through the second feed ports 34 of the feed pipes 25 provided in three locations on the donut-shaped lid body 4, and therefore, as well as feeding the dry air in the radial direction from the rotary central axis C side, the dry air can be fed from the annular passage 5 side, or in other words the outer peripheral side of the powder and granular material feeder. As a result, all of the powder and granular material existing in the powder and granular material feeder can be evenly dried.

Hence, the powder and granular material 3 supplied into the tubular hopper 11 flows out into the annular passage 5 at the angle of repose q, whereupon the powder and granular material 3 in the annular passage 5 is fed by the rotary blades 8 and discharged, i.e. supplied, continuously downward through the discharge port 6. While the powder and granular material is being supplied continuously, gas such as dry air can be fed continuously over the entire upper surface 1a of the bottom plate 1' of the powder and granular material feeder from the annular space S on the lower side of the boss portion in the center of the rotary blades 8, and as a result, the powder and granular material 3 can be continuously dried.

In the present invention, as described above, gas such as dry air can be fed continuously in the radial direction from the vicinity of the central portion (the boss portion) of the upright rotary shaft 7 of the rotary blades 8, and can therefore be fed sufficiently even to the powder and granular material in the central lower portion of the powder and granular material feeder near the upright rotary central shaft, where conventionally the gas cannot easily be supplied in a sufficient amount. As a result, the powder and granular material 3 can be evenly and continuously dried.

Further, the gas can be fed in an outside direction (the direction of the outer periphery 1) from the lower surface 8c side of the rotary blades 8 near the base portion 8b thereof, and therefore the gas can also be fed sufficiently to the lower surface 8c side of the rotary blades 8, where the density of the powder and granular material is comparatively low. Hence, the gas can be fed to all of the powder and granular material 3 on the bottom plate 1', and as a result, the powder and granular material 3 can be evenly dried and so on.

Furthermore, as well as feeding the gas from the central portion of the powder and granular material feeder in the vicinity of the upright rotary shaft 7, the gas can be fed from the annular passage 5 serving as the outer periphery of the powder and granular material feeder, and as a result, the powder and granular material 3 can be dried and so on more efficiently.

Moreover, by providing the exhaust fan 29 in the tubular hopper 11 provided as a powder and granular material introduction hopper, the gas fed into the powder and granular material feeder can be discharged forcibly, with the result that all of the powder and granular material can be dried and so on even more efficiently.

Furthermore, by providing the rotary valve 27 in the powder and granular material discharge port 6, outflow of the gas through the discharge port 6 can be suppressed such that only the powder and granular material 3 subjected to drying processing and so on is discharged. As a result, the powder and granular material 3 can be dried and so on even more efficiently.

A case in which the exhaust fan 29 is provided in the upper portion of the tubular hopper 11 to forcibly discharge the gas was described in the above embodiment, but depending on the properties of the powder and granular material and the fed gas, the exhaust fan 29 may be omitted such that the gas is discharged naturally through the exhaust pipe 28.

A case in which dry air is fed to the powder and granular material as the gas for drying the powder and granular material was described in the above embodiment, but the present invention is not limited thereto, and may also be used in a case where the powder and granular material is both dried and dehumidified by dry air. The present invention may also be used in various other applications, such as a case in which the powder and granular material is humidified by feeding steam as the gas and a case in which the powder and granular material is fumigated by feeding gas containing pharmaceuticals.

Moreover, in the above embodiment, a substance in so-called fine powder form is used as the powder and granular material, but the powder and granular material is not limited to a powder form substance, and various powder and granular materials, for example comparatively heavy pellets and synthetic resin powder and granular materials such as plastic waste, may be used instead. Note that 35 in FIG. 1 is a powder and granular material outflow prevention plate, and 36 in FIG. 2 is a drain board.

INDUSTRIAL APPLICABILITY

The gas feeding apparatus for a powder and granular material feeder according to the present invention can be used widely as an apparatus for subjecting various types of powder and granular materials, such as pellets, to continuous drying, humidifying, fumigating, and so on.

EXPLANATION OF REFERENCE NUMERALS 1 outer tube
1' bottom plate
1a upper surface
2 inner tube
3 powder and granular material
4 donut-shaped lid body
5 annular passage
6 discharge port
7 upright rotary shaft
8 rotary blades
8c lower surface
9 rotating wheel
11 tubular hopper
15 boss
15a boss disc
20 first feed port
22 annular damming plate
23 upper portion slit
24 lower portion slit
25 feed pipe
27 rotary valve
29 exhaust fan
31 powder and granular material case
34 second feed port
L diameter line
q angle of repose
S space (annular space)
t1 powder and granular material discharge clearance

The invention claimed is:

1. A gas feeding apparatus for a powder and granular material feeder, comprising:
   a powder and granular material feed case formed by erecting an outer tube on a bottom plate;
   an inner tube having upper and lower openings disposed above the bottom plate via a powder and granular material discharge clearance; and
   an annular passage formed between the inner and outer tubes by connecting an outside surface of the inner tube to an upper end of the outer tube concentrically using a donut-shaped lid body,
   wherein an upright rotary shaft is disposed in a center of the bottom plate, a boss portion is disposed on an upper portion of the upright rotary shaft, a plurality of rotary blades extending over the bottom plate are disposed on an outer periphery of the boss portion at a fixed distance from the bottom plate, and respective tip ends of the rotary blades are connected to a rotating wheel disposed to extend around an inner peripheral surface of the outer tube, and wherein a discharge port is formed in the bottom plate as an opening in the annular passage such that a powder and granular material spread over the annular passage at a predetermined angle of repose from the powder and granular material discharge clearance is fed to the discharge port by the rotary blades, and wherein a first feed port for a gas is disposed in the bottom plate on a lower surface of the boss portion so that the gas can be fed into a space between an upper surface of the bottom plate and the lower surface of the boss portion, and an annular damming plate is formed concentrically with the inner and outer tubes on the lower surface of the boss portion on an outer side of the first feed port so that the gas fed into the space through the first feed port can be fed in a radial direction via slits disposed around the annular damming plate.

2. The gas feeding apparatus for a powder and granular material feeder according to claim 1, wherein the slits disposed in the annular damming plate are positioned on a lower surface side of the rotary blades disposed on the outer periphery of the boss portion.

3. The gas feeding apparatus for a powder and granular material feeder according to claim 1, wherein the slits disposed in the annular damming plate are constituted by an upper portion slit disposed between the lower surface of the boss portion and the annular damming plate, and a lower portion slit disposed between a lower end of the annular damming plate and the upper surface of the bottom plate.

4. The gas feeding apparatus for a powder and granular material feeder according to claim 1, wherein the first feed port is disposed in each of symmetrical positions along a diameter line of the annular damming plate on the lower surface of the boss portion, centering on the upright rotary shaft.

5. The gas feeding apparatus for a powder and granular material feeder according to claim 1, wherein a second feed port is disposed in the donut-shaped lid body such that the gas is fed into the annular passage through the second feed port in the donut-shaped lid body.

6. The gas feeding apparatus for a powder and granular material feeder according to claim 1, wherein a powder and granular material introduction hopper is connected fixedly to an upper end of the inner tube, and an exhaust fan for the gas fed into the powder and granular material feeder is disposed in the hopper.

7. The gas feeding apparatus for a powder and granular material feeder according to claim 1, wherein a rotary valve is disposed in the discharge port for the powder and granular material.

8. The gas feeding apparatus for a powder and granular material feeder according to claim 2, wherein the slits disposed in the annular damming plate are constituted by an upper portion slit disposed between the lower surface of the boss portion and the annular damming plate, and a lower portion slit disposed between a lower end of the annular damming plate and the upper surface of the bottom plate.

9. The gas feeding apparatus for a powder and granular material feeder according to claim 2, wherein the first feed port is disposed in each of symmetrical positions along a diameter line of the annular damming plate on the lower surface of the boss portion, centering on the upright rotary shaft.

10. The gas feeding apparatus for a powder and granular material feeder according to claim 3, wherein the first feed port is disposed in each of symmetrical positions along a diameter line of the annular damming plate on the lower surface of the boss portion, centering on the upright rotary shaft.

11. The gas feeding apparatus for a powder and granular material feeder according to claim 2, wherein a second feed port is disposed in the donut-shaped lid body such that the gas is fed into the annular passage through the second feed port in the donut-shaped lid body.

12. The gas feeding apparatus for a powder and granular material feeder according to claim 3, wherein a second feed port is disposed in the donut-shaped lid body such that the gas is fed into the annular passage through the second feed port in the donut-shaped lid body.

13. The gas feeding apparatus for a powder and granular material feeder according to claim 4, wherein a second feed port is disposed in the donut-shaped lid body such that the gas is fed into the annular passage through the second feed port in the donut-shaped lid body.

* * * * *